(12) United States Patent
Tateishi et al.

(10) Patent No.: US 9,449,277 B2
(45) Date of Patent: Sep. 20, 2016

(54) IMPLICATION DETERMINING DEVICE, IMPLICATION DETERMINING METHOD AND IMPLICATION DETERMINING PROGRAM DETERMINING IF HYPOTHESIS IS A NEW FACT

(75) Inventors: Kenji Tateishi, Tokyo (JP); Kai Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 350 days.

(21) Appl. No.: 13/823,293

(22) PCT Filed: Oct. 17, 2011

(86) PCT No.: PCT/JP2011/005787
§ 371 (c)(1),
(2), (4) Date: May 14, 2013

(87) PCT Pub. No.: WO2012/053175
PCT Pub. Date: Apr. 26, 2012

(65) Prior Publication Data
US 2013/0232098 A1 Sep. 5, 2013

(30) Foreign Application Priority Data
Oct. 21, 2010 (JP) ................................. 2010-236548

(51) Int. Cl.
*G06F 17/00* (2006.01)
*G06N 5/04* (2006.01)
*G06F 17/27* (2006.01)

(52) U.S. Cl.
CPC ............. *G06N 5/04* (2013.01); *G06F 17/2785* (2013.01)

(58) Field of Classification Search
USPC .............................................. 706/12, 45, 62
See application file for complete search history.

(56) References Cited

U.S. PATENT DOCUMENTS

| 7,313,515 | B2 * | 12/2007 | Crouch et al. .................... 704/9 |
| 2007/0255555 | A1 * | 11/2007 | Crouch .................... G06N 5/02 704/9 |
| 2009/0077113 | A1 * | 3/2009 | Fidaali et al. ................ 707/102 |
| 2009/0327811 | A1 * | 12/2009 | Hofford ................. G06N 5/025 714/26 |
| 2010/0138694 | A1 * | 6/2010 | Harrison ............. G06F 11/0739 714/26 |

FOREIGN PATENT DOCUMENTS

| JP | 2004145753 A | 5/2004 |
| JP | 2005267663 A | 9/2005 |
| JP | 2008083993 A | 4/2008 |

OTHER PUBLICATIONS

The international search report for PCT/JP2011/005787 mailed on Jan. 17, 2012.

(Continued)

*Primary Examiner* — David Vincent

(57) ABSTRACT

To provide an implication determining device, an implication determining method, and an implication determining program capable of improving implication determination performance. A new fact determination unit determines whether a given hypothesis is a new fact that indicates a first revealed fact in a hypothesis implied sentence that is a sentence implying the given hypothesis based on a specific expression written in the hypothesis implied sentence. An implication determination unit determines whether the given hypothesis is implied in a sentence to be determined that is a sentence to be determined whether the hypothesis is included.

9 Claims, 11 Drawing Sheets

(56) References Cited

OTHER PUBLICATIONS

Adrian Iftene, "Textual Entailment", Oct. 2009., PH. D. Thesis, TR 09-02, [online], [searched on Oct. 4, 2010], Internet http://profs.info.uaic.ro/-tr/tr09-02.pdf.

ChaSen—Morphological analyzer, 2007, Nara Institute of Science and Technology, [online], [searched on Oct. 18, 2010], Internet http://chasen-legacy.sourceforge.jp/.

Thorsten Joachims, "Support Vector Machine", Aug. 14, 2008, [online], [searched on Oct. 18, 2010], Internet http://svmlight.joachims.org/.

"Ross Quinlan", [online], [Searched on Oct. 18, 2010], Internet <http://www.rulequest.com/Personall>.

Kunihiro Udaka et al., "n-gram o Mochiita Nihongo Text Gan'i Ninshiki no Kento", Proceedings of the 16th annual meeting of the Association for Natural Language Processing, Mar. 8, 2010, pp. 462-465.

\* cited by examiner

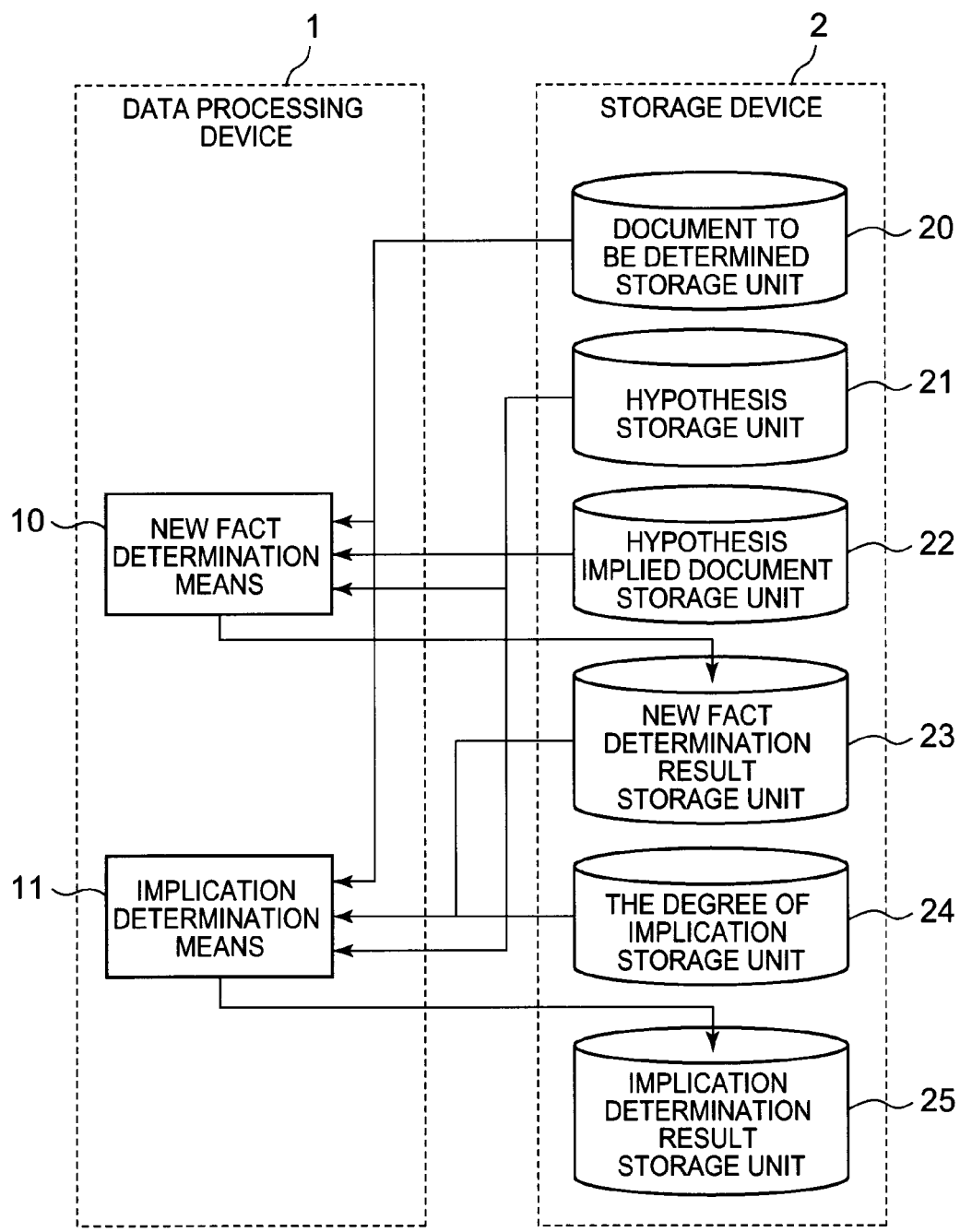

FIG. 2

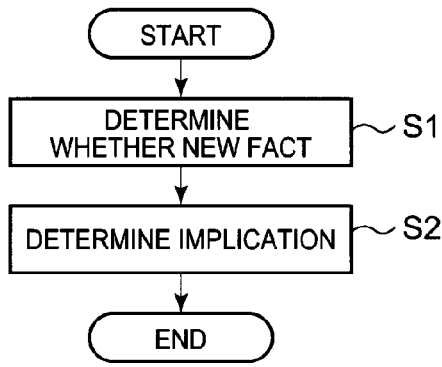

FIG. 3

HYPOTHESIS STORAGE UNIT

| HYPOTHESIS ID | HYPOTHESIS | DOCUMENT ID | SENTENCE ID |
|---|---|---|---|
| 1 | MOUNTAIN PASS WHERE SUSPECT QQRR WAS ARRESTED IS A PLACE TO WHICH HE WENT FREQUENTLY BY CAR WHEN HE WAS YOUNG | 1 | 1 |

(a)

HYPOTHESIS IMPLIED DOCUMENT STORAGE UNIT

| DOCUMENT ID | SENTENCE ID | DATE AND TIME | SENTENCE CONTENT |
|---|---|---|---|
| 1 | 1 | 2010/04/01 | IT HAS BEEN FOUND OUT THAT SUSPECT QQRR (42) ARRESTED ON SUSPICION OF ATTEMPTED MURDER DEPOSED THAT MOUNTAIN PASS WHERE HE WAS ARRESTED BY MAKING EMERGENCY CALL TO POLICE ON HIS OWN IS "PLACE OF MEMORIES TO WHICH HE WENT FREQUENTLY BY CAR WHEN HE WAS YOUNG" BY INTERVIEW WITH INVESTIGATION HEADQUARTERS |

(b)

DOCUMENT TO BE DETERMINED STORAGE UNIT

| DOCUMENT ID | SENTENCE ID | DATE AND TIME | SENTENCE CONTENT |
|---|---|---|---|
| 10 | 1 | 2010/03/01 | N SAID "THIS MOUNTAIN PASS IS PLACE OF MEMORIES TO WHICH HE WENT FREQUENTLY BY CAR WHEN HE WAS YOUNG" |

NEW FACT DETERMINATION RESULT STORAGE UNIT

| HYPOTHESIS ID | DOCUMENT ID | SENTENCE ID | DETERMINATION RESULT |
|---|---|---|---|
| 1 | 1 | 1 | 1 |

(a)

THE DEGREE OF IMPLICATION STORAGE UNIT

| HYPOTHESIS ID | DOCUMENT ID | SENTENCE ID | THE DEGREE OF SIMILARITY |
|---|---|---|---|
| 1 | 10 | 1 | 0.56 (5/9) |

(b)

IMPLICATION DETERMINATION RESULT STORAGE UNIT

| HYPOTHESIS ID | DOCUMENT ID | SENTENCE ID | DETERMINATION RESULT |
|---|---|---|---|
| 1 | 10 | 1 | 0 |

HYPOTHESIS STORAGE UNIT

| HYPOTHESIS ID | HYPOTHESIS | DOCUMENT ID | SENTENCE ID |
|---|---|---|---|
| 2 | QQRR WAS ARRESTED | 1 | 1 |

(a)

HYPOTHESIS IMPLIED DOCUMENT STORAGE UNIT

| DOCUMENT ID | SENTENCE ID | DATE AND TIME | SENTENCE CONTENT |
|---|---|---|---|
| 1 | 1 | 2010/04/01 | IT HAS BEEN FOUND OUT THAT SUSPECT QQRR (42) ARRESTED ON SUSPICION OF ATTEMPTED MURDER DEPOSED THAT MOUNTAIN PASS WHERE HE WAS ARRESTED BY MAKING EMERGENCY CALL TO POLICE ON HIS OWN IS "PLACE OF MEMORIES TO WHICH HE WENT FREQUENTLY BY CAR WHEN HE WAS YOUNG" BY INTERVIEW WITH INVESTIGATION HEADQUARTERS |

(b)

DOCUMENT TO BE DETERMINED STORAGE UNIT

| DOCUMENT ID | SENTENCE ID | DATE AND TIME | SENTENCE CONTENT |
|---|---|---|---|
| 11 | 1 | 2010/02/01 | HIROSHIMA PREFECTURAL POLICE ANNOUNCED THAT QQRR WAS ARRESTED RED HANDED |
| 12 | 1 | 2010/01/01 | QQRR WAS ARRESTED RED HANDED |

NEW FACT DETERMINATION RESULT STORAGE UNIT

| HYPOTHESIS ID | DOCUMENT ID | SENTENCE ID | DETERMINATION RESULT |
|---|---|---|---|
| 2 | 1 | 1 | 0 |

(a)

THE DEGREE OF IMPLICATION STORAGE UNIT

| HYPOTHESIS ID | DOCUMENT ID | SENTENCE ID | THE DEGREE OF SIMILARITY |
|---|---|---|---|
| 2 | 11 | 1 | 1.0 |
| 2 | 12 | 1 | 0.67 |

(b)

IMPLICATION DETERMINATION RESULT STORAGE UNIT

| HYPOTHESIS ID | DOCUMENT ID | SENTENCE ID | DETERMINATION RESULT |
|---|---|---|---|
| 2 | 11 | 1 | 1 |
| 2 | 12 | 1 | 1 |

| HYPOTHESIS STORAGE UNIT (SECOND TIME) | | | |
|---|---|---|---|
| HYPOTHESIS ID | HYPOTHESIS | DOCUMENT ID | SENTENCE ID |
| 2 | QQRR WAS ARRESTED | 1 | 1 |
| 2 | QQRR WAS ARRESTED | 11 | 1 |

(a)

| HYPOTHESIS IMPLIED DOCUMENT STORAGE UNIT | | | |
|---|---|---|---|
| DOCUMENT ID | SENTENCE ID | DATE AND TIME | SENTENCE CONTENT |
| 1 | 1 | 2010/04/01 | IT HAS BEEN FOUND OUT THAT SUSPECT QQRR (42) ARRESTED ON SUSPICION OF ATTEMPTED MURDER DEPOSED THAT MOUNTAIN PASS WHERE HE WAS ARRESTED BY MAKING EMERGENCY CALL TO POLICE ON HIS OWN IS "PLACE OF MEMORIES TO WHICH HE WENT FREQUENTLY BY CAR WHEN HE WAS YOUNG" BY INTERVIEW WITH INVESTIGATION HEADQUARTERS |
| 11 | 1 | 2010/04/01 | HIROSHIMA PREFECTURAL POLICE ANNOUNCED THAT QQRR WAS ARRESTED RED HANDED |

(b)

NEW FACT DETERMINATION RESULT STORAGE UNIT
(SECOND TIME)

| HYPOTHESIS ID | DOCUMENT ID | SENTENCE ID | DETERMINATION RESULT |
|---|---|---|---|
| 2 | 1 | 1 | 0 |
| 2 | 11 | 1 | 1 |

(a)

THE DEGREE OF IMPLICATION STORAGE UNIT
(SECOND TIME)

| HYPOTHESIS ID | DOCUMENT ID | SENTENCE ID | THE DEGREE OF SIMILARITY |
|---|---|---|---|
| 2 | 11 | 1 | 1.0 |
| 2 | 12 | 1 | 0.67 |

(b)

DETERMINATION RESULT STORAGE UNIT (SECOND TIME)

| HYPOTHESIS ID | DOCUMENT ID | SENTENCE ID | DETERMINATION RESULT |
|---|---|---|---|
| 2 | 11 | 1 | 1 |
| 2 | 12 | 1 | 0 |

(c)

IMPLICATION DETERMINING DEVICE, IMPLICATION DETERMINING METHOD AND IMPLICATION DETERMINING PROGRAM DETERMINING IF HYPOTHESIS IS A NEW FACT

This application is a National Stage Entry of PCT/JP2011/005787 filed Oct. 17, 2011, which claims priority from Japanese Patent Application 2010-236548 filed Oct. 21, 2010, the contents of all of which are incorporated herein by reference, in their entirety.

TECHNICAL FIELD

The present invention relates to an implication determining device, an implication determining method, and an implication determining program that determines whether a given sentence to be determined implies a given hypothesis.

BACKGROUND ART

Implication determination is to determine whether a given sentence to be determined T implies a given hypothesis H (a task). The sentence to be determined T implies the hypothesis H means that a human who reads the sentence to be determined T can infer the hypothesis H as a fact. Assume that the hypothesis H of "Prime minister K has visited United States of America" and the sentence to be determined T of "Prime minister K has visited White House" are given as objects with which the implication determination is performed. In this case, a human who reads the sentence to be determined T can infer the hypothesis H as a fact, and therefore, it is determined that the sentence to be determined T implies the hypothesis H.

A typical method of the implication determination is disclosed in Non Patent Literature 1. The method disclosed in Non Patent Literature 1 calculates a ratio of a word or a set of dependency included in the hypothesis H in common in the sentence T (hereinafter, described as a common ratio). When the calculated common ratio is equal to or more than a threshold value of the degree of similarity (a reference value) that serves as a reference, it is determined that the sentence T implies the hypothesis H. Also, Non Patent Literature 1 discloses, as a system of the implication determination, a system in which a word used when the common ratio is calculated is expanded to a range of a thesaurus and a system in which a negative form of a sentence or modality is determined.

Further, Patent Literature 1 discloses a sentence retrieval device that retrieves related sentences similar in topic. The sentence retrieval device disclosed in Patent Literature 1 determines whether sentences are related based on the similarity of topic included in each sentence. Also, the sentence retrieval device disclosed in Patent Literature 1 determines whether the sentences are initial related documents or following related documents based on a date on which each related document is announced or reported.

Note that Patent Literature 2 discloses a communication assistance device for a smooth conversation. The device disclosed in Patent Literature 2 compares an utterance to be determined with an earlier utterance, and determines an element included in the earlier utterance but not included in the utterance to be determined as new information. To be more specific, the device disclosed in Patent Literature 2 compares a linguistic structure of a sentence in the first language uttered by a first language speaker and a linguistic structure of a sentence in the second language, and extracts new information that represents a content newly uttered in the sentence in the second language. The extracted new information is preferentially output to the other party of conversation.

CITATION LIST

Patent Literature

PLT 1: Japanese Patent Application Laid-Open No. 2004-145753 (paragraph 0044)
PLT 2: Japanese Patent Application Laid-Open No. 2008-83993 (paragraphs 0050 and 0053)

Non Patent Literature

NPL 1: Adrian Iftene, "Textual Entailment", October 2009., PH. D. Thesis, TR 09-02, [online], [searched on Oct. 4, 2010], Internet <http://profs.info.uaic.ro/~tr/tr09-02.pdf>

SUMMARY OF INVENTION

Hereinafter, a device that performs the implication determination and outputs a determination result will be described as an implication determining device. Also, when there is a set of correct answers (to be specific, a set of a hypothesis and a sentence that implies the hypothesis), a ratio of original correct answers included in the output results among the results determined as correct answers by and output from the implication determining device is described as a "relevance ratio". Also, among the set of correct answers, a ratio of correct answers determined as correct answers by and output from the implication determining device is described as a "recall ratio". That is, the "relevance ratio" is an index to measure accuracy of an output from the implication determining device, and the "recall ratio" is an index to measure comprehensiveness of an output from the implication determining device.

The typical implication determining method disclosed in Non Patent Literature 1 has a problem of low implication determination performance. To prevent erroneous determination (that is, to enhance the relevance ratio), typically, it is necessary to set a high reference value. However, when the reference value is set to be high, omission of determination occurs in large numbers, and this leads to a decrease in the recall ratio. There is diversity in expression of sentence. Therefore, even a sentence to be determined that implies a hypothesis may not necessarily have a high common ratio.

Also, the sentence retrieval device disclosed in Patent Literature 1 determines whether documents are related based on the degree of similarity between topics of the documents. However, as a method of calculating the degree of similarity, a typically well-known method is merely used. Also, even if the related documents are arranged by date, this simply makes the context of the documents clear, and the degree of similarity between the related documents is not changed. Therefore, even if the device disclosed in Patent Literature 1 is used, it is difficult to improve the implication determination performance.

Therefore, an object of the present invention is to provide an implication determining device, an implication determining method, and an implication determining program capable of improving the implication determination performance.

Solution to Problem

An implication determining device according to the present invention is provided with a new fact determination means configured to determine whether a given hypothesis is a new fact indicating a first revealed fact in a hypothesis implied sentence implying the hypothesis based on a specific expression written in the hypothesis implied sentence, and an implication determination means configured to determine whether the given hypothesis is implied in a sentence to be determined that is a sentence to be determined whether the hypothesis is included, and when it is determined that the given hypothesis is the new fact in the hypothesis implied sentence, the implication determination means compares a date and time of occurrence of the sentence to be determined and a date and time of occurrence of the hypothesis implied sentence implying the hypothesis, and determines whether the sentence to be determined implies the given hypothesis.

An implication determining method according to the present invention determines whether a given hypothesis is a new fact indicating a first revealed fact in a hypothesis implied sentence that is a sentence implying the hypothesis based on a specific expression written in the hypothesis implied sentence, and, when it is determined that the given hypothesis is the new fact in the hypothesis implied sentence, compares a date and time of occurrence of the sentence to be determined that is a sentence to be determined whether the given hypothesis is included and a date and time of occurrence of the hypothesis implied sentence implying the hypothesis, and determines whether the sentence to be determined implies the given hypothesis.

An implication determining program according to the present invention causes a computer to execute a new fact determination process to determine whether a given hypothesis is a new fact indicating a first revealed fact in a hypothesis implied sentence that is a sentence implying the hypothesis based on a specific expression written in the hypothesis implied sentence, and an implication determination process to determine whether the given hypothesis is implied in a sentence to be determined that is a sentence to be determined whether the given hypothesis is included, and, when it is determined that the given hypothesis is the new fact in the hypothesis implied sentence, in the implication determination process, a date and time of occurrence of the sentence to be determined and a date and time of occurrence of the hypothesis implied sentence implying the hypothesis are compared, and whether the sentence to be determined implies the given hypothesis is determined.

Advantageous Effects of Invention

According to the present invention, the implication determination performance can be improved.

BRIEF DESCRIPTION OF DRAWINGS

FIG. 1 It depicts a block diagram illustrating an example of an implication determining device in a first exemplary embodiment of the present embodiment.

FIG. 2 It depicts a flowchart illustrating an operation of the implication determining device in the first exemplary embodiment.

FIG. 3 It depicts an explanatory diagram illustrating an example of information stored in a storage device.

FIG. 4 It depicts an explanatory diagram illustrating an example of information stored in a storage device.

FIG. 10 It depicts an explanatory diagram illustrating an example of information stored in a storage device.

FIG. 11 It depicts an explanatory diagram illustrating information stored in a storage device.

FIG. 12 It depicts an explanatory diagram illustrating an example of information stored in a storage device.

DESCRIPTION OF EMBODIMENTS

Figure 5:
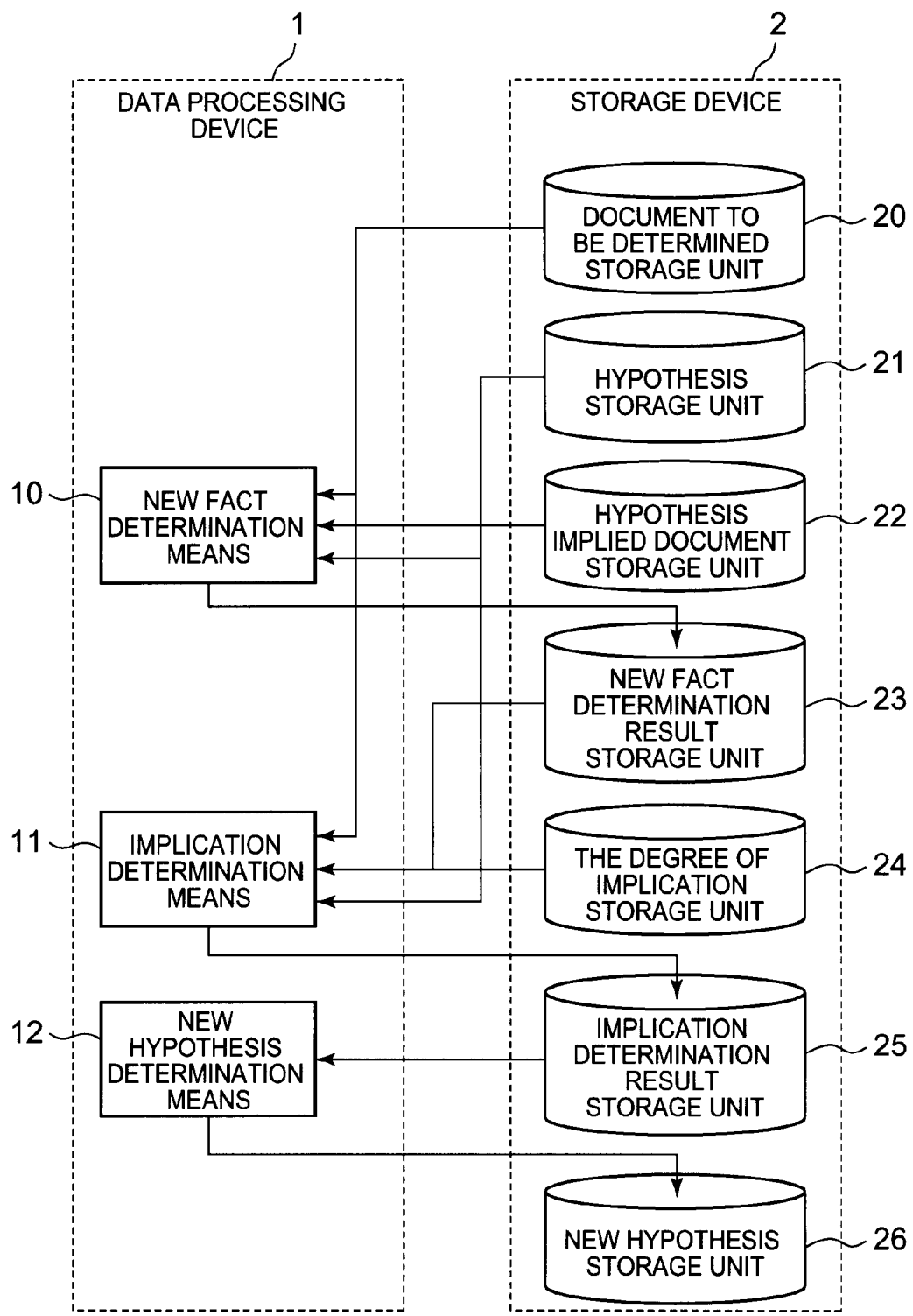
FIG. 5 It depicts a block diagram illustrating an example of an implication determining device in a second exemplary embodiment of the present invention.

Hereinafter, exemplary embodiments of the present embodiment will be described with reference to the drawings.

Exemplary Embodiment 1

FIG. 1 is a block diagram illustrating an example of an implication determining device in a first exemplary embodiment of the present invention. The implication determining device in the present exemplary embodiment is provided with a data processing device 1 that operates by program control and a storage device 2 that stores information.

The data processing device 1 includes a new fact determination means 10 and an implication determination means 11.

The new fact determination means 10 determines, in a sentence that implies a given hypothesis (hereinafter, described as a hypothesis implied sentence), whether the hypothesis is a first revealed fact (new fact) based on a specific expression written in the hypothesis implied sentence. Note that a method of determining a new fact will be described below.

The implication determination means 11 determines whether a sentence that is to be determined whether it includes a hypothesis (hereinafter, described as a sentence to be determined) implies a given hypothesis. Then, the implication determination means 11 determines that the sentence to be determined does not imply the given hypothesis when it is determined that the given hypothesis is a new fact in the hypothesis implied sentence and when a date and time of occurrence of the sentence to be determined is older than a date and time of occurrence of the hypothesis implied sentence. Here, the date and time of occurrence means a date and time at which a document (sentence) occurs such as a date and time at which a document (sentence) is created or issued. Hereinafter, a date and time of occurrence of a sentence to be determined and a date and time of occurrence of a hypothesis implied sentence may be respectively described as a date and time of a sentence to be determined and a date and time of a hypothesis implied sentence.

Further, the implication determination means 11 may determine whether the sentence to be determined implies the hypothesis using the degree of implication that indicates the degree of implication of the sentence to be determined implying the hypothesis (hereinafter, described as the degree of implication between the hypothesis and the sentence to be determined). At this time, the implication determination means 11 may use the degree of similarity in description between the hypothesis and the sentence to be determined as the degree of implication, for example. To be specific, when the date and time of occurrence of the sentence to be determined is older than the date and time of occurrence of the hypothesis implied sentence that implies the given hypothesis, the implication determination means 11 may grant a penalty to the degree of implication between the given hypothesis and the sentence to be determined. Further, when the degree of implication after grant of the penalty falls below a predetermined reference value, the implication determination means 11 may determine that the sentence to be determined does not imply the hypothesis. The degree of implication is calculated with a word written in the hypothesis and in the sentence to be determined, or the degree of a set of dependency in common, and the like. Note that a method of calculating the degree of implication will be described below.

The storage device 2 includes a document to be determined storage unit 20, a hypothesis storage unit 21, a hypothesis implied document storage unit 22, a new fact determination result storage unit 23, a degree of implication storage unit 24, and an implication determination result storage unit 25. The document to be determined storage unit 20, the hypothesis storage unit 21, the hypothesis implied document storage unit 22, the new fact determination result storage unit 23, the degree of implication storage unit 24, and the implication determination result storage unit 25 are respectively realized by a magnetic disc and the like.

The document to be determined storage unit 20 stores a set of documents including a sentence to be determined. To be specific, the document to be determined storage unit 20 stores a sentence to be determined and a date and time of the sentence to be determined in association with each other. The sentence to be determined is stored in the document to be determined storage unit 20 by a user and the like in advance.

The hypothesis storage unit 21 stores a hypothesis to be determined. Note that the hypothesis storage unit 21 may store one hypothesis or a plurality of hypotheses. The hypothesis is stored in the hypothesis storage unit 21 by the user and the like in advance.

The hypothesis implied document storage unit 22 stores a set of documents including a sentence that implies a hypothesis (that is, a hypothesis implied sentence). To be specific, the hypothesis implied document storage unit 22 stores the hypothesis implied sentence and a date and time of the hypothesis implied sentence in association with each other. The hypothesis implied document storage unit 22 stores a sentence that has been known to imply a specific hypothesis (hypothesis implied sentence) in advance. Note that this hypothesis implied sentence is stored in the hypothesis implied document storage unit 22 by the user and the like in advance. Also, a document that includes at least one hypothesis implied sentence corresponds to each hypothesis.

The new fact determination result storage unit 23 stores a result of determination by the new fact determination means 10. To be specific, the new fact determination result storage unit 23 stores a result of determination of whether a given hypothesis is a first revealed fact in a hypothesis implied sentence.

The degree of implication storage unit 24 stores the degree of implication between a hypothesis and a sentence to be determined.

The implication determination result storage unit 25 stores a result of determination by the implication determination means 11. To be specific, the implication determination result storage unit 25 stores a result of determination of whether a sentence to be determined implies a given hypothesis.

The new fact determination means 10 and the implication determination means 11 are realized by a CPU of a computer that operates according to a program (implication determining program). For example, the program is stored in a storage unit (not illustrated) of the data processing device 1, and the CPU reads the program and may operate as the new fact determination means 10 and the implication determination means 11 according to the program. Alternatively, the new fact determination means 10 and the implication determination means 11 may respectively realized by dedicated hardware.

Next, an operation of the implication determining device of the present exemplary embodiment will be described. FIG. 2 is a flowchart illustrating an operation of the implication determining device in the first exemplary embodiment. Also, FIGS. 3 and 4 are explanatory diagrams illustrating an example of information stored in the storage device 2. In the description below, the document to be determined storage unit 20, the hypothesis storage unit 21, and the hypothesis implied document storage unit 22 store data exemplarily illustrated in FIG. 3.

The hypothesis storage unit 21 stores, as exemplarily illustrated in FIG. 3(*a*), a hypothesis ID item, a hypothesis item, a document ID item, and a sentence ID item. The hypothesis storage unit 21 stores an identifier of a hypothesis (hereinafter, hypothesis ID) as the hypothesis ID item, and stores a content of a hypothesis as the hypothesis item. Also, the hypothesis storage unit 21 stores an identifier of a document that implies a hypothesis as the document ID item, and stores an identifier of a sentence that implies a hypothesis as the sentence ID item. In the description below, the identifier of a sentence is described as a sentence ID and the identifier of a document is described as a document ID.

The hypothesis implied document storage unit 22 stores, as exemplarily illustrated in FIG. 3(*b*), a document ID item, a sentence ID item, a date and time item, and a sentence content item. The hypothesis implied document storage unit 22 stores a document ID of a document that includes a sentence that implies a hypothesis as the document ID item, and stores a sentence ID of a sentence that implies a hypothesis as the sentence ID item. Also, the hypothesis implied document storage unit 22 stores a date and time of occurrence of a document as the date and time item, and stores a content of a hypothesis implied sentence as the sentence content item. The correspondence relation between a hypothesis and a sentence that implies the hypothesis is determined with the document ID and the sentence ID stored in the hypothesis storage unit 21 and in the hypothesis implied document storage unit 22. The example illustrated in FIGS. 3(*a*) and 3(*b*) indicates that a sentence identified by the "document ID=1" and the "sentence ID=1" stored in the hypothesis implied document storage unit 22 implies a hypothesis identified by the "hypothesis ID=1" stored in the hypothesis storage unit 21.

The document to be determined storage unit 20 stores, as exemplarily illustrated in FIG. 3(*c*), a document ID item, a sentence ID item, a date and time item, and a sentence content item. The document to be determined storage unit 20 stores a document ID of a document including a sentence to be determined as the document ID item, and stores a sentence ID of a sentence to be determined as the sentence ID item. Also, the document to be determined storage unit 20 stores an issue date and time of a document as the date and time item, and stores a content of a sentence to be determined as the sentence content item. Hereinafter, in the present exemplary embodiment, a case will be exemplarily described, in which the document to be determined storage unit 20, the hypothesis storage unit 21, and the hypothesis implied document storage unit 22 respectively store information illustrated in FIG. 3.

First, the new fact determination means 10 determines whether a hypothesis is a first revealed fact in a hypothesis implied sentence (that is, a new fact) using a specific expression included in the hypothesis implied sentence (step S1 in FIG. 2). To be specific, the new fact determination means 10 determines whether the hypothesis is a new fact with respect to the hypothesis implied sentence stored in the hypothesis implied document storage unit 22 with a clue of expressions exemplarily illustrated in the following (1) to (5).

Note that, in the description below, a hypothesis H used for description of (1), (2), and (3) is "a mountain pass where the suspect QQRR was arrested is a place to which he went frequently by car when he was young", and a hypothesis H used for description of (4) and (5) is "QQRR was arrested". Note that QQ represents a family name and RR represents a first name.

Further, in the description below, a hypothesis implied sentence T_H used for the description of (1) to (4) is "one week has passed on 29th since the twelve employees were hit by a passenger car, and were killed or injured in the head office and the factory of M (XX ward, Z city, YY town, W prefecture). It has been found out that the suspect QQRR (42) arrested on suspicion of attempted murder deposed that the mountain pass where he was arrested by making an emergency call to the police on his own is "a place of memories to which he went frequently by car when he was young" by an interview with an investigation headquarters", and a hypothesis implied sentence T_H used for the description of (5) is "one week has passed on 29th since the suspect QQRR was arrested.".

(1) It is determined that a hypothesis H is a new fact in a hypothesis implied sentence T_H if "an expression that indicates a source of information exists" in the T_H.

In the above-described example, the expression of "by an interview with an investigation headquarters" in the hypothesis implied sentence T_H would be the expression that indicates a source of information. Therefore, the new fact determination means 10 determines that the hypothesis H is a new fact in the hypothesis implied sentence T_H. Other than the above, expressions such as "by an interview with officials" and "has announced" can be used as the expression that indicates a source of information. The new fact determination means 10 may determine that the hypothesis H is a new fact in the hypothesis implied sentence T_H when such an expression is included. Further, in a case where the hypothesis implied sentence is an English sentence, when expressions such as "according to", "said", "told", "reported", "announced" and the like are included in the hypothesis implied sentence, these expressions may be used as the expression that indicates a source of information.

As described above, the new fact determination means 10 determines that a hypothesis H is a new fact, which is implied in a hypothesis implied sentence T_H that includes a predetermined character string that indicates a source of information. Note that, regarding the predetermined character string used for the determination, expressions that can be considered to indicate a source of information may just be set in advance.

(2) It is determined that a hypothesis H is a new fact in a hypothesis implied sentence T_H if "the degree of similarity between the hypothesis H and a headline (title) is high (the degree of similarity is equal to or more than a threshold value set in advance)" of a document that includes the T_H.

The degree of similarity between the hypothesis H and the headline is calculated by a method similar to the method of calculating the degree of implication described below. For example, assume that the headline (heading) of the hypothesis implied sentence T_H in the above-described example is "the suspect QQRR deposing "the mountain pass where arrested is a place of memories". What happened to the ex "street racer"?". Nine words t of "QQ", "RR", "suspect", "arrest", "mountain pass", "young", "car", "go frequently", and "place" are selected as independent words from among words obtained as a result of a morphological analysis of the hypothesis H. Similarly, words t are selected from the hypothesis implied sentence T_H.

The words included in the hypothesis implied sentence T_H from among the nine words included in the hypothesis H are six words of "QQ", "RR", "suspect", "arrest", "mountain pass", and "place". Therefore, in a case where all of the degrees of importance of the words t (hereinafter, weight (t)) are one, the degree of similarity between the H and the headline is calculated to be 0.67 (=6/9). Here, when a reference value (hereinafter, described as a hypothesis determination reference value) at the time of determining a hypothesis is set to be 0.5, the degree of similarity in this example is larger than the hypothesis determination reference value. Therefore, it is determined that the hypothesis H is a new fact in the T_H.

Note that the hypothesis determination reference value is set by the user and the like in advance. Also, the headline of each hypothesis implied sentence is created by the user and the like in advance, and is, for example, stored in the hypothesis implied document storage unit 22 as a different item. Also, the degree of similarity between the hypothesis H and the headline is not limited to the above-described method. In this way, when the degree of similarity between the headline and the hypothesis H in the hypothesis implied sentence T_H is larger than the hypothesis determination reference value, the new fact determination means 10 determines that the hypothesis H implied in the hypothesis implied sentence T_H is a new fact.

(3) It is determined that a hypothesis H is a new fact in a hypothesis implied sentence T_H if "a direct expression that expresses a new fact exists" in the T_H.

In the above-described example, an expression of "found out" in the hypothesis implied sentence T_H corresponds to the direct expression that indicates a new fact. Therefore, the new fact determination means 10 determines that the hypothesis H is a new fact in the hypothesis implied sentence T_H. Other than the above, an expression such as "became clear" can be the direct expression that indicates a new fact. In this way, the new fact determination means 10 determines that a hypothesis H is a new fact, which is implied in a hypothesis implied sentence T_H that includes a predetermined direct expression that indicates a new fact. Note that, regarding the predetermined expression used for the determination, an expression that can be considered to indicate a new fact may be set in advance.

(4) It is determined that a hypothesis H is a new fact in a hypothesis implied sentence T_H if "a time expression that expresses a past exists" in the T_H.

In the above-described example, an expression of "∘∘ weeks have passed on 0th" in the hypothesis implied sentence T_H would be the time expression that expresses a past. Therefore, the new fact determination means 10 determines that the hypothesis H is not a new fact in the hypothesis implied sentence T_H.

For example, when some patterns of the expression that expresses a past are prepared in advance and when the hypothesis implied sentence T_H accords with any one of the patterns, the new fact determination means 10 may determine that the time expression that expresses a past exists in the hypothesis implied sentence T_H. Further, in this case, a pattern described in a regular expression may be used. An expression of "¥d+(week|year)" corresponds to the pattern described in a regular expression, for example. Here, ¥d represents a numerical value, + represents one or more repetition, and (week|year) represents either week or year. In the above-described example, the hypothesis implied sentence T_H includes the expression of "one week" that accords with this pattern, and therefore, the new fact determination means 10 determines that the hypothesis H is not a new fact in the hypothesis implied sentence T_H.

Note that a method of determining whether the time expression that expresses a past is included is not limited to the above-described method. In this way, the new fact determination means 10 determines that a hypothesis H is not a new fact, which is implied in a hypothesis implied sentence T_H that includes a predetermined time expression that expresses a past.

(5) It is determined that a hypothesis H is not a new fact in a hypothesis implied sentence T_H if "a hypothesis is written as an insertion paragraph" in the T_H.

Here, "written" corresponds not only to a case where the description of the hypothesis H and the description included in the hypothesis implied sentence T_H fully accords with each other, but also to a case where contents of the descriptions are extremely close to each other (contents of the descriptions are equivalent to each other).

In the above-described example, the hypothesis H of "QQRR was arrested" is written in a portion of "the suspect QQRR (42) arrested on suspicion of attempted murder . . . " in the hypothesis implied sentence T_H as an insertion paragraph. Therefore, the new fact determination means 10 determines that the hypothesis H is not a new fact in the hypothesis implied sentence T_H.

The new fact determination means 10 may determine that the hypothesis H is written as an insertion paragraph when a paragraph that accords with the hypothesis H is written in the hypothesis implied sentence T_H. However, a method of determining the insertion paragraph by the new fact determination means 10 is not limited to the method of determining whether the contents accord with each other. The new fact determination means 10 may determine whether a hypothesis H is an insertion paragraph in a hypothesis implied sentence T_H by whether an indeclinable word and a declinable word included in the hypothesis H is connected in attributive modification relation in the hypothesis implied sentence T_H, for example. The new fact determination means 10 may use "arrested QQRR" as the insertion paragraph, which is a paragraph obtained by replacing the indeclinable word and the declinable word in the hypothesis H of "QQRR was arrested" in the above-described example. In this way, when the hypothesis implied sentence T_H includes an equivalent content of the description to the content of the description of the hypothesis H, the new fact determination means 10 determines that the hypothesis H is not a new fact.

As described above, when a hypothesis implied sentence T_H includes a predetermined expression, the new fact determination means 10 may determine whether a hypothesis H is a new fact in the hypothesis implied sentence T_H in accordance with the expression.

Note that, if there is a plurality of clues for determining whether a new fact, an order of priority may be given to these clues in advance. When there are the above-described clues of (1) to (5), the order of priority is given in order of (5), (3), (1), (4), and (2), and the new fact determination means 10 may perform a determination process in this order. Also, if a hypothesis does not accord with any one of the clues, the new fact determination means 10 may determine that the hypothesis H is not a new fact in a hypothesis implied sentence T_H.

The new fact determination means 10 stores a determination result in the new fact determination result storage unit 23. FIG. 4(a) is an explanatory diagram illustrating an example of the determination result stored in the new fact determination result storage unit 23. The example illustrated in FIG. 4(a) is a result of a determination process executed by the new fact determination means 10 with respect to the state exemplarily illustrated in 10 FIG. 3. The example illustrated in FIG. 4(a) indicates that a hypothesis implied sentence with respect to the hypothesis ID=1 stored in the hypothesis storage unit 21 is a sentence identified by the document ID=1 and the sentence ID=1 in the hypothesis implied document storage unit 22.

To be specific, the hypothesis implied sentence identified by the document ID=1 and the sentence ID=1 in the hypothesis implied document storage unit 22 accords with the condition of the clues (1) and (3). Therefore, the new fact determination means 10 determines that the hypothesis H is a new fact. Therefore, the new fact determination means 10 sets information that indicates it is the new fact to a determination result item in the new fact determination result storage unit 23. The example illustrated in FIG. 4(a) indicates a hypothesis identified by the hypothesis ID=1 in the hypothesis implied sentence identified by the document ID=1 and the sentence ID=1 is a new fact (determination result=1).

Next, when it is determined that a hypothesis is a new fact in a hypothesis implied sentence, and a date and time of occurrence of a sentence to be determined is older than a date and time of occurrence of the hypothesis implied sentence, the implication determination means 11 determines that the sentence to be determined does not imply the hypothesis. Note that, in this case, the implication determination means 11 may grant a penalty to the degree of implication between the hypothesis and the sentence to be determined (step S2 in FIG. 2).

First, an operation will be described, in which the implication determination means 11 determines that a sentence to be determined does not imply a hypothesis in step S2.

FIG. 4(c) is an explanatory diagram illustrating an example of a determination result stored in the implication determination result storage unit 25. The determination result illustrated in FIG. 4(c) indicates a result of a determination process performed by the implication determination means 11 based on the determination result exemplarily illustrated in FIG. 4(a). Referring to the new fact determination result storage unit 23, it has been determined that a hypothesis identified by the hypothesis ID=1 stored in the hypothesis storage unit 21 is a new fact in a hypothesis implied sentence identified by the document ID=1 and the sentence ID=1. Also, referring to the hypothesis implied document storage unit 22, a date and time of occurrence of the hypothesis implied sentence identified by the document ID=1 and the sentence ID=1 is "Apr. 1, 2010".

Meanwhile, a date and time of a sentence to be determined identified by the document ID=10 and the sentence ID=1 stored in the document to be determined storage unit 20 is "Mar. 1, 2010". Therefore, the date and time of the sentence to be determined is older than the date and time of the hypothesis implied sentence. Therefore, the implication determination means 11 determines that the sentence to be determined identified by the document ID=10 and the sentence ID=1 does not imply the hypothesis identified by the hypothesis ID=1, and stores 0 in the determination result in the implication determination result storage unit 25. Here, the determination result is 0 means that the sentence to be determined does not imply the hypothesis.

Next, an operation will be described, in which the implication determination means 11 grants a penalty to the degree of implication between the hypothesis and the sentence to be determined in step S2. Note that, in a case where the degree of implication is used, the degree of implication between the hypothesis and the sentence to be determined is calculated in advance and stored in the degree of implication storage unit 24. FIG. 4(*b*) is an explanatory diagram illustrating an example of the degree of implication stored in the degree of implication storage unit 24. In the example illustrated in FIG. 4(*b*), the hypothesis implied sentence with respect to the hypothesis ID=1 stored in the hypothesis storage unit 21 is a sentence identified by the document ID=1 and the sentence ID=1 in the hypothesis implied document storage unit 22, and indicates that the degree of implication between the hypothesis and the hypothesis implied sentence is 0.56. Note that a method of calculating the degree of implication will be described below.

Hereinafter, a method of granting a penalty to the degree of implication between a hypothesis and a sentence to be determined will be described. A first method is a method of decreasing the degree of implication by a certain value or by a certain ratio. In this case, the implication determination means 11 determines that a sentence to be determined does not imply a hypothesis if the degree of implication after the decrease is less than a reference value. A second method is a method of increasing the reference value by a certain value or by a certain ratio. In this case, the implication determination means 11 determines that a sentence to be determined does not imply a hypothesis if the degree of implication is less than the increased reference value. Also, these methods may be performed simultaneously. That is, an example of the first method of granting a penalty to the degree of implication includes a method of decreasing a value of the degree of implication. Also, an example of the second method includes a method of increasing a value of the predetermined reference value. Further, an example of a third method includes a method of decreasing the value of the degree of implication and increasing the value of the reference value.

A determination process of granting a penalty using the second method will be described with reference to FIGS. 4(*a*) to 4(*c*). Referring to the new fact determination result storage unit 23 exemplarily illustrated in FIG. 4(*a*), it has been determined that a hypothesis identified by the hypothesis ID=1 stored in the hypothesis storage unit 21 is a new fact (determination result=1) in a hypothesis implied sentence identified by the document ID=1 and the sentence ID=1. Also, referring to the hypothesis implied document storage unit 22, a date and time of the hypothesis implied sentence identified by the document ID=1 and the sentence ID=1 is "Apr. 1, 2010". Meanwhile, a date and time of a sentence to be determined identified by the document ID=10 and the sentence ID=1 stored in the document to be determined storage unit 20 is "Mar. 1, 2010".

Further, referring to the degree of implication storage unit 24 exemplarily illustrated in FIG. 4(*b*), the degree of implication between the hypothesis identified by the hypothesis ID=1 and the sentence to be determined identified by the document ID=10 and the sentence ID=1 is 0.56. When the reference value is 0.5 and the certain value to be increased is 0.2, the reference value becomes 0.7. The degree of implication between the hypothesis identified by the hypothesis ID=1 and the sentence to be determined identified by the document ID=10 and the sentence ID=1 is 0.56, and is smaller than 0.7 made by 0.2 and the reference value of 0.5. Therefore, the implication determination means 11 determines that the sentence to be determined does not imply the hypothesis, and stores a determination result 0 in the implication determination result storage unit 25.

Here, a method of calculating the degree of implication will be described. The degree of implication can be calculated as a ratio of a word in common included in both of the hypothesis and the sentence to be determined, or of a set of dependency in common. To be specific, the degree of implication is calculated with a following formula.

$$\text{Sim}(H,T) = \Sigma t \subset H \cap T\ \text{weight}(t) / \Sigma t \subset H\ \text{weight}(t)$$

Here, H represents a hypothesis and T represents a sentence to be determined. Also, $t \subset H$ represents a word included in H, $t \subset H \cap T$ represents a word common to H and T, and weight (t) represents the degree of importance of a word t.

The word t may just be extracted from the hypothesis and the sentence to be determined by a morphological analysis. To be specific, the word t may be extracted from the hypothesis and the sentence to be determined using morphological analysis software. When the morphological analysis software is used, a sentence is divided into words, and a part of speech is given to each of the words. At this time, it is possible to employ only independent words such as a noun, a verb, an adjective, and an adjective verb as the word t instead of employing all parts of speech.

For example, if a hypothesis H is "A was arrested in Tokyo", "A", "Tokyo", and "arrest" are extracted by the morphological analysis, and these words becomes a set of the words t included in the hypothesis H. Note that, as the morphological analysis software, ChaSen is available, for example. Note that ChaSen is introduced in Reference Literature 1 below.

<Reference Literature 1>"ChaSen—Morphological analyzer", 2007, Nara Institute of Science and Technology, [online], [searched on Oct. 18, 2010], Internet <http://chasen-legacy.sourceforge.jp/>

A simplest method is a method of setting 1 to all of the degrees of importance weight (t) of the words t. In this case, Sim (H, T) means a ratio of words in common included in the hypothesis H and in the sentence to be determined T. Also, another method is a method of using the number of documents in which the word t appears. In this case, when the number of document in which the word t appears is df(t) and the number of all documents is |D|, the degree of importance of the word t is calculated with weight (t)=log (|D|/df(t)). Note that log is a logarithm to the base 2 or 10.

Here, a method of calculating the degree of implication between the hypothesis H identified by the hypothesis ID=1 stored in the hypothesis storage unit 21 and the sentence to be determined T identified by the document ID=10 and the sentence ID=1 stored in the document to be determined storage unit 20 exemplarily illustrated in FIG. 3 will be described. When independent words are selected from among the words extracted from the hypothesis H by the morphological analysis, a set of the word s t included in the hypothesis H is "QQ", "RR", "suspect", "arrest", "mountain pass", "young", "car", "go frequently", and "place". The words t are extracted from the sentence to be determined T in a similar manner. Among the nine words included in the hypothesis H, words also included in the sentence to be determined T are five words of "mountain pass", "young", "car", "go frequently", and "place". Here, when all of the weights (t) are 1, the degree of similarity is calculated to be 5/9=0.56. Note that the degree of implication calculated with respect to the state exemplarily illustrated in FIG. 3 is stored in the degree of implication storage unit 24 exemplarily illustrated in FIG. 4(b).

Note that the above-described method of calculating the degree of implication is an example of calculating the degree of implication between a hypothesis and a sentence to be determined, and is not limited to the above-described system. For example, as Sim (H, T), the degree of similarity in cosine or Jaccard coefficient may be used.

Also, a method using a word as t when Sim (H, T) is calculated has been described in the above description. However, a set of dependency of words may be used instead of the word. The set of dependency represents a set of two words in a relation of dependency. For example, when the hypothesis H is "A was arrested in Tokyo", "A—arrest" and "Tokyo—arrest" are a set of t included in the hypothesis H as the set of dependency.

Also, a classifier may be used for the calculation of the degree of implication. The classifier is a system to automatically classify data into two categories, and software that incorporates the classifier therein is widely known. When the software that incorporates the classifier is used, a user prepares, in advance, (i) a word vector of the data classified into the two categories in advance and (ii) a word vector of unclassified data. A characteristic vector is a vector in which a word included in data is treated in dimensions of vector, and a value of each dimension represents the degree of importance of the word or the existence of the word (0/1) in the data.

The software that incorporates the classifier is configured from two parts of a learning process and a classifying process. First, in the learning process, the classifier is created with the word vector of the data classified in advance as input data. At this time, a classification criteria is usually decided in the classifier, which indicates a possibility of a document more likely to belong to one of the categories when what types of words are included. Next, in the classifying process, unclassified data is classified into any one of the two categories using the classifier created in the learning process.

To apply the software that incorporates the classifier to the present invention, data to be classified is made to be a set of a hypothesis and a sentence to be determined, and the two categories may be "the sentence to be determined implies the hypothesis or does not imply the hypothesis". That is, if (i) a word vector of a set of the hypothesis and the sentence to be determined classified into two categories in advance and (ii) a word vector of a set of the unclassified hypothesis and sentence to be determined are prepared, the detailed process will be similar to the above-described process.

Note that the sum of respective word vectors of the hypothesis and the sentence to be determined may just be the word vector of the set of the hypothesis and the sentence to be determined. As a result of using the classifier, when the data is classified into the category of "implies", the determination result of the data is 1, and when the data is classified into the category of "does not imply", the determination result of the data is 0, and the respective determination results are stored in the degree of implication storage unit 24.

Note that, as examples of the software that incorporates the classifier, SVM-Light that incorporates a support vector machine (SVM) and C4.5 that incorporates a decision tree are known. Note that SVM-Light is introduced in Reference Literature 2 below. Also, C4.5 is downloadable from a web page shown in Reference Literature 3 below.

<Reference Literature 2> Thorsten Joachims, "Support Vector Machine", Aug. 14, 2008, [online], [searched on Oct. 18, 2010], Internet <http://svmlight.joachims.org/>

<Reference Literature 3>"Ross Quinlan", [online], [Searched on Oct. 18, 2010], Internet <http://www.rulequest.com/Personal/>

As described above, according to the present exemplary embodiment, the new fact determination means 10 determines whether a given hypothesis H is first revealed fact (new fact) in a hypothesis implied sentence T_H based on a specific expression written in the hypothesis implied sentence T_H. Then, the implication determination means 11 compares a date and time of occurrence of a sentence to be determined T and a date and time of occurrence of the hypothesis implied sentence T_H when it is determined that the given hypothesis H is a new fact in the hypothesis implied sentence T_H, and determines whether the sentence to be determined T implies the given hypothesis H.

To be specific, when the date and time of occurrence of the sentence to be determined T is older than the date and time of occurrence of the hypothesis implied sentence T_H, the implication determination means 11 determines that the sentence to be determined T does not imply the given hypothesis H. With such a configuration, the implication determination performance can be improved. To be specific, the relevance ratio can be improved without lowering the recall ratio.

That is, the new fact determination means 10 determines whether the hypothesis H is a new fact in the hypothesis implied sentence T_H in advance. When it is determined that the hypothesis is a new fact, and the date of the sentence to be determined T is older than that of the hypothesis implied sentence T_H, the implication determination means 11 determines that the sentence to be determined T does not imply the hypothesis H. Therefore, the implication determination performance can be improved.

This is because, if the hypothesis H is a new fact in the hypothesis implied sentence T_H, the sentence to be determined T older than the hypothesis implied sentence T_H does not imply the hypothesis H. Therefore, the sentence to be determined T that does not imply the hypothesis H can be accurately determined (that is, the relevance ratio can be improved) without uniformly setting the high reference value (that is, without lowering the recall ratio) unlike a typical method.

For example, a typical method disclosed in Non Patent Literature 1 performs a determination process using only the degree of implication (that is, the degree of implication stored in the degree of implication storage unit 24). In this case, referring to a content of the degree of implication storage unit 24 exemplarily illustrated in FIG. 4(b), the degree of similarity between the hypothesis identified by the hypothesis ID=1 and the sentence to be determined identified by the document ID=10 and the sentence ID=1 is 0.56. Here, when the reference value is 0.5, the typical method disclosed in Non Patent Literature 1 determines that the sentence to be determined implies the hypothesis. However, this sentence to be determined does not imply the hypothesis, and therefore, the determination is incorrect. Meanwhile, according to the present exemplary embodiment, the implication determination means 11 performs determination using the determination result by the new fact determination means 10, and therefore, can determine that the sentence to be determined does not imply the hypothesis.

Exemplary Embodiment 2

FIG. 5 is a block diagram illustrating an example of an implication determining device in a second exemplary embodiment of the present invention. Note that a similar configuration to the first exemplary embodiment will be provided with the same reference numerals as FIG. 1, and description is omitted. The implication determining device in the present exemplary embodiment is provided with a data processing device 1 that operates by program control and a storage device 2 that stores information.

The data processing device 1 includes a new fact determination means 10, an implication determination means 11, and a new hypothesis determination means 12. Among these means, details of the new fact determination means 10 and the implication determination means 11 are similar to the first exemplary embodiment, and therefore, description is omitted.

The new hypothesis determination means 12 identifies a hypothesis that is not implied in any sentence to be determined. To be specific, based on the determination result by the implication determination means 11, the new hypothesis determination means 12 determines that a hypothesis, which has no sentence to be determined that implies the hypothesis, is a hypothesis that is not implied in any sentence to be determined among a set of documents to be determined. The new hypothesis determination means 12 may, for example, identify a hypothesis that does not have the determination result of "1" from among the hypotheses stored in the implication determination result storage unit 25 by the implication determination means 11 as the hypothesis that is not implied in any sentence to be determined.

The storage device 2 includes a document to be determined storage unit 20, a hypothesis storage unit 21, a hypothesis implied document storage unit 22, a new fact determination result storage unit 23, a degree of implication storage unit 24, an implication determination result storage unit 25, and a new hypothesis storage unit 26. Among these units, details of the document to be determined storage unit 20, the hypothesis storage unit 21, the hypothesis implied document storage unit 22, the new fact determination result storage unit 23, the degree of implication storage unit 24, and the implication determination result storage unit 25 are similar to the first exemplary embodiment, and therefore, description is omitted.

The new hypothesis storage unit 26 stores a hypothesis that is determined not to be implied in any sentence to be determined by the new hypothesis determination means 12. The new hypothesis storage unit 26 may store a content of the hypothesis and may store a hypothesis ID. The new hypothesis storage unit 26 is realized by a magnetic disc and the like, for example.

The new fact determination means 10, the implication determination means 11, and the new hypothesis determination means 12 are realized by a CPU of a computer that operates according to a program (implication determining program). Alternatively, the new fact determination means 10, the implication determination means 11, and the new hypothesis determination means 12 may be respectively realized by dedicated hardware.

Figure 6:
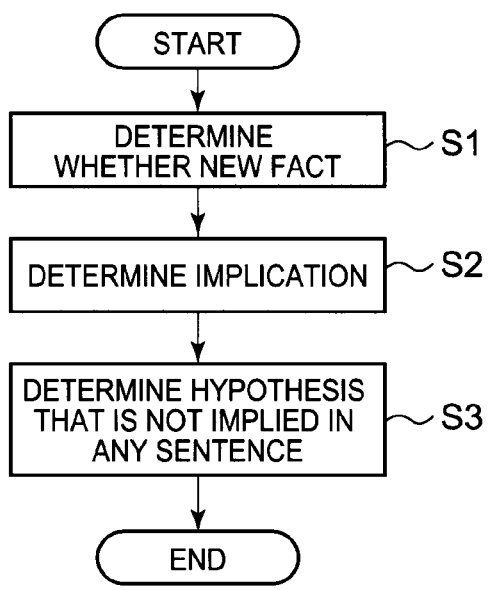
FIG. 6 It depicts a flowchart illustrating an operation of the implication determining device in the second exemplary embodiment.
Figure 7:
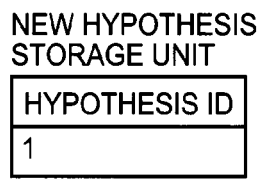
FIG. 7 It depicts an explanatory diagram illustrating an example of information stored in a storage device.

Next, an operation of the implication determining device of the present exemplary embodiment will be described. FIG. 6 is a flowchart illustrating an operation of the implication determining device in the second exemplary embodiment. Also, FIG. 7 is an explanatory diagram illustrating an example of information stored in the storage device 2. Note that processes in which the new fact determination means 10 determines whether a hypothesis is a new fact and the implication determination means 11 determines whether a sentence to be determined implies the hypothesis are similar to the processes of steps S1 to S2 in FIG. 2, and therefore, description is omitted.

The new hypothesis determination means 12 determines that a hypothesis that is not implied in any sentence is not written in a set of documents to be determined based on the determination result by the implication determination means 11 (step S3 in FIG. 6).

FIG. 7 is an explanatory diagram illustrating an example of a content of the new hypothesis storage unit 26. A hypothesis identified by the hypothesis ID=1 is stored in the implication determination result storage unit 25 exemplarily illustrated in FIG. 4(c). However, no data of the determination result=1 exists. Therefore, no sentence to be determined exists, which implies the hypothesis identified by the hypothesis ID=1. Therefore, the new hypothesis determination means 12 determines that the hypothesis identified by the hypothesis ID=1 is not implied in any sentence to be determined, and stores the hypothesis ID=1 in the new hypothesis storage unit 26 as exemplarily illustrated in FIG. 7.

As described above, according to the present exemplary embodiment, whether a hypothesis is written in a set of documents to be determined can be determined in addition to the effect in the first exemplary embodiment. The reason is that the new hypothesis determination means 12 determines, by referring to the result by the implication determination means 11, that a hypothesis that is not implied in any sentence to be determined is not written in a set of documents to be determined. That is, it is because when there is a hypothesis that is determined by the implication determination means 11 such that no sentence to be determined that implies the hypothesis exists, the new hypothesis determination means 12 determines that the hypothesis is not implied in any sentence to be determined.

Further, selection of a candidate sentence of a summary in an update summarization task (UST) becomes possible by using the implication determining device in the present exemplary embodiment. UST is a task to summarize a content of description of a set of documents A on condition that a content of a previously written set of documents B is well known. If each sentence included in the set of documents A is made to be a hypothesis and a sentence in the set of documents B is made to be a sentence to be determined, the implication determining device according to the present exemplary embodiment can determine a sentence that is included in the set of documents A and is not written in the set of documents B. A sentence determined in this way may be made to be the candidate sentence of a summary.

Exemplary Embodiment 3

Figure 8:
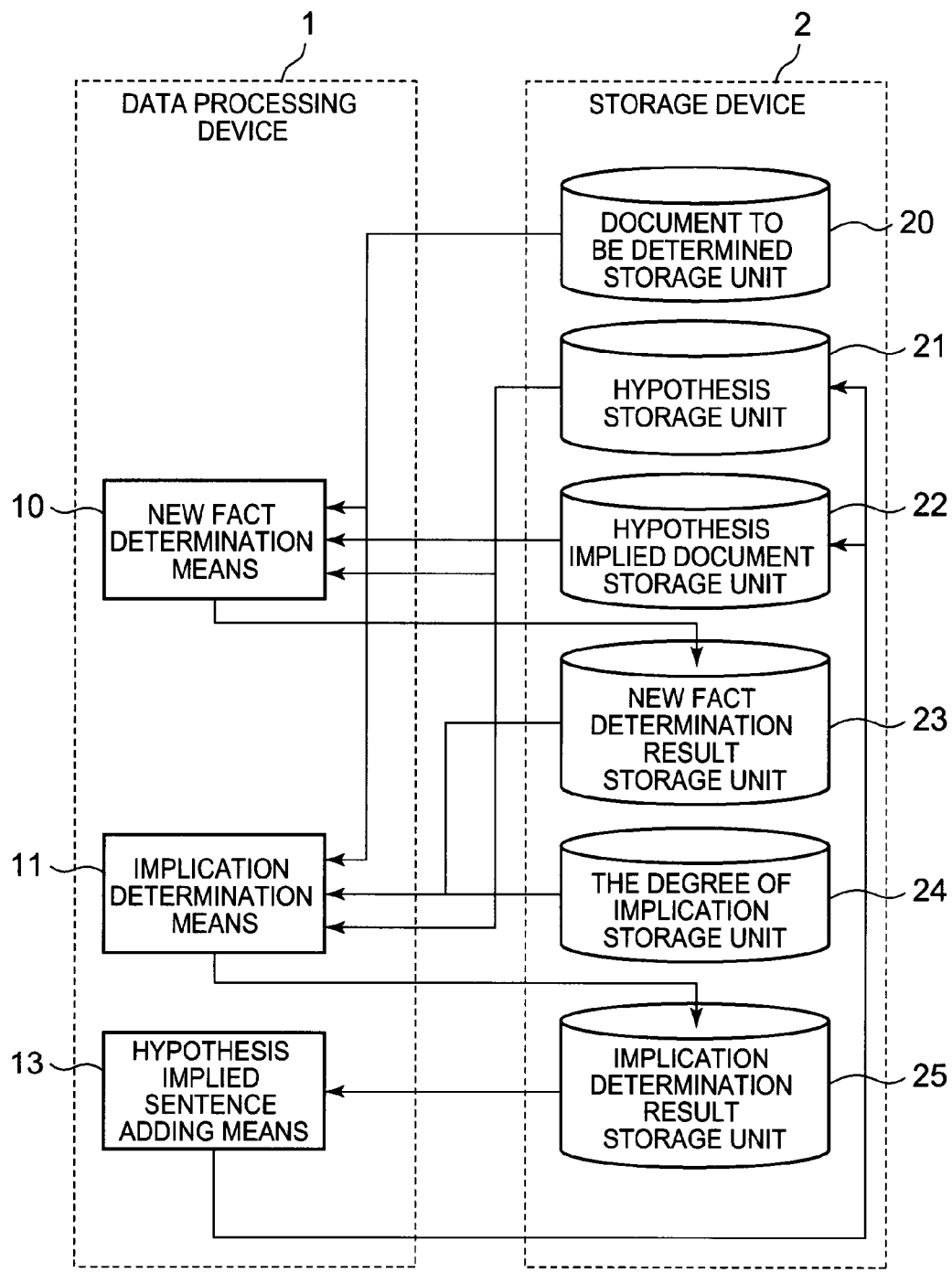
FIG. 8 It depicts a block diagram illustrating an example of an implication determining device in a third exemplary embodiment of the present invention.

FIG. 8 is a block diagram illustrating an example of an implication determining device in a third exemplary embodiment of the present invention. Note that a similar configuration to the first exemplary embodiment will be provided with the same reference numerals as FIG. 1, and description is omitted. The implication determining device in the present exemplary embodiment is provided with a data processing device 1 that operates by program control and a storage device 2 that stores information.

The storage device 2 includes a document to be determined storage unit 20, a hypothesis storage unit 21, a hypothesis implied document storage unit 22, a new fact determination result storage unit 23, a degree of implication storage unit 24, and an implication determination result storage unit 25. A Detail of the storage device 2 is similar to the first exemplary embodiment, and therefore, description is omitted.

The data processing device 1 includes a new fact determination means 10, an implication determination means 11, and a hypothesis implied sentence adding means 13. Among these means, details of the new fact determination means 10 and the implication determination means 11 are similar to the first exemplary embodiment, and therefore, description is omitted.

The hypothesis implied sentence adding means 13 adds a sentence to be determined that implies a hypothesis as a hypothesis implied sentence based on the determination result by the implication determination means 11, and notifies the new fact determination means 10 of a content thereof. To be specific, when the implication determination means 11 determines that a sentence to be determined implies a given hypothesis, the hypothesis implied sentence adding means 13 adds the sentence to be determined as a hypothesis implied sentence. At this time, the hypothesis implied sentence adding means 13 may store a content of the sentence to be determined that is determined to imply the hypothesis in the hypothesis storage unit 21 and in the hypothesis implied document storage unit 22.

The new fact determination means 10, the implication determination means 11, and the hypothesis implied sentence adding means 13 are realized by a CPU of a computer that operates according to a program (implication determining program). Alternatively, the new fact determination means 10, the implication determination means 11, and the hypothesis implied sentence adding means 13 may be respectively realized by dedicated hardware.

Figure 9:
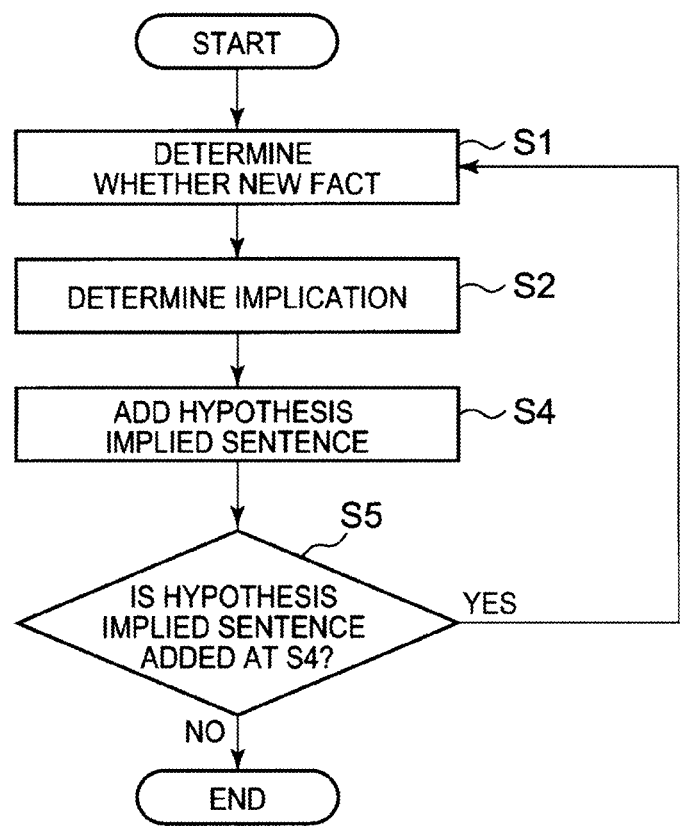
FIG. 9 It depicts a flowchart illustrating an operation of the implication determining device in the third exemplary embodiment.

Next, an operation of the implication determining device of the present exemplary embodiment will be described. FIG. 9 is a flowchart illustrating an operation of the implication determining device in the third exemplary embodiment. Also, FIGS. 10 to 13 are explanatory diagrams illustrating an example of information stored in the storage device 2. Note that the processes in which the new fact determination means 10 determines whether a hypothesis is a new fact and the implication determination means 11 determines whether a sentence to be determined implies the hypothesis are similar to the processes of steps S1 and S2 in FIG. 2. However, in the description of the operation, a content exemplarily illustrated in FIG. 10 as an initial state is written in the hypothesis storage unit 21 (see FIG. 10(*a*)), in the hypothesis implied document storage unit 22 (see FIG. 10(*b*)), and in the document to be determined storage unit 20 (see FIG. 10(*c*)). To be specific, the present embodiment differs from the first exemplary embodiment in the following points: the hypothesis storage unit 21 stores a hypothesis identified by the hypothesis ID=2, and the document to be determined storage unit 20 stores a sentence identified by the document ID=11 and the sentence ID=1 and a sentence identified by the document ID=12 and the sentence ID=1.

As a result of the processes to step S2, a content exemplarily illustrated in FIG. 11 is stored in the new fact determination result storage unit 23 (see FIG. 11(*a*)) and the degree of implication storage unit 24 (see FIG. 11(*b*)). As exemplarily illustrated in FIG. 11(*a*), it is determined that the hypothesis identified by the hypothesis ID=2 is not a new fact in the hypothesis implied sentence identified by the document ID=1 and the sentence ID=1 (determination result=0). This is because the hypothesis implied sentence identified by the document ID=1 and the sentence ID=1 accords with the condition of the clue (5) described in the first exemplary embodiment.

Also, the degrees of implication between the hypothesis identified by the hypothesis ID=2 and the two sentences to be determined (the sentence identified by the document ID=11 and the sentence ID=1 and the sentence identified by the document ID=12 and the sentence ID=1) stored in the document to be determined storage unit 20 are calculated using the method described in the first exemplary embodiment, and the calculated degrees of implication are stored in the degree of implication storage unit 24 in advance. In the example illustrated in FIG. 11(*b*), the degrees of implication are 1.0 and 0.67, respectively. Here, when the reference value is set to be 0.5, both of the degrees of implication are equal to or more than the reference value, and therefore, both of the sentences to be determined will be determined to imply the hypothesis. Determination results are stored in the implication determination result storage unit 25 as sentences to be determined that imply the hypothesis, as exemplarily illustrated in FIG. 11(*c*).

Following step S2, the hypothesis implied sentence adding means 13 adds the sentence to be determined that implies the hypothesis as a hypothesis implied sentence based on the determination result by the implication determination means 11, and notifies the new fact determination means 10 of a content thereof (step S4 in FIG. 9). At this time, the hypothesis implied sentence adding means 13 may store a content of the sentence to be determined in the hypothesis storage unit 21 and in the hypothesis implied document storage unit 22.

For example, when the implication determination means 11 determines that a sentence to be determined having the degree of implication between the hypothesis and the sentence to be determined of 0.7 or more is a hypothesis implied sentence, the hypothesis implied sentence adding means 13 stores the sentence to be determined identified by the document ID=11 and the sentence ID=1 and having the degree of implication of 1.0 in the hypothesis implied document storage unit 22 according to FIG. 11(*b*). Further, the hypothesis implied sentence adding means 13 stores a content of the document ID=11 and the sentence ID=1 that implies the hypothesis identified by the hypothesis ID=2 in the hypothesis storage unit 21. As a result, a content of the hypothesis implied document storage unit 22 is changed from an initial state exemplarily illustrated in FIG. 10 to a state exemplarily illustrated in FIG. 12.

In step S4, when the hypothesis implied sentence is added (YES at step S5 in FIG. 9), step S1 and the following processes to determine whether a hypothesis is a new fact are repeated. Meanwhile, when the hypothesis implied sentence is not added (NO at step S5), the process is terminated.

Figures 13, 14:
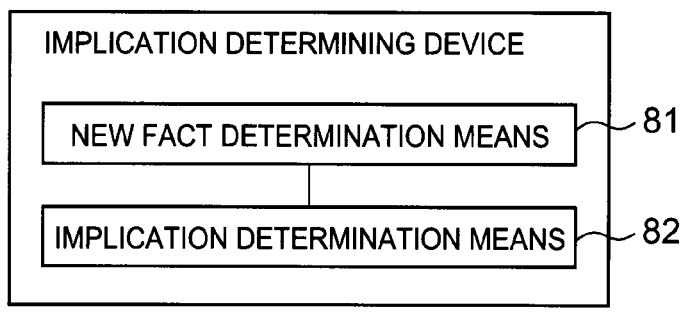
FIG. 13 It depicts an explanatory diagram illustrating an example of information stored in the storage device.
FIG. 14 It depicts a block diagram illustrating an example of a minimum configuration of an implication determining device according to the present invention.

A result obtained by executing steps S1 and S2 again using the changed hypothesis storage unit 21 and hypothesis implied document storage unit 22 exemplarily illustrated in FIG. 12 is illustrated in FIG. 13. A difference from the first time is that it is determined that the hypothesis identified by the hypothesis ID=2 is a new fact in the document ID=11 and the sentence ID=1. This is because the hypothesis implied sentence identified by the document ID=11 and the sentence ID=1 accords with the condition of the clue (1) described in the first exemplary embodiment.

As described above, according to the present exemplary embodiment, implied sentence retrieval performance can be improved in addition to the effect in the first exemplary embodiment. The reason is that the hypothesis implied sentence adding means 13 notifies the new fact determination means 10 of the sentence to be determined that is determined to imply the hypothesis by the implication determination means 11 as a hypothesis implied sentence. That is, it is because when the implication determination means 11 determines that a sentence to be determined implies a given hypothesis, the hypothesis implied sentence adding means 13 adds the sentence to be determined as a hypothesis implied sentence.

For example, assuming that a content exemplarily illustrated in FIG. 10 is stored in the storage device 2 as an initial state. In the first process, it is determined that the sentence to be determined identified by the document ID=12 and the sentence ID=1 implies the hypothesis identified by the hypothesis ID=2. However, this is essentially incorrect. Even if such an error occurs, as a result of the first process, the sentence to be determined identified by the document ID=11 and the sentence ID=1 becomes a hypothesis implied sentence. Therefore, by executing the second process, it can be corrected such that the sentence to be determined identified by the document ID=12 and the sentence ID=1 does not imply the hypothesis identified by the hypothesis ID=2.

Next, a minimum configuration of the present invention will be described. FIG. 14 is a block diagram illustrating a minimum configuration of the implication determining device according to the present invention. The implication determining device according to the present invention is provided with a new fact determination means 81 (for example, a new fact determination means 10) that determines whether a given hypothesis (for example, a hypothesis H) is a new fact that indicates a first revealed fact in a hypothesis implied sentence (for example, a hypothesis implied sentence T_H) that implies the given hypothesis based on a specific expression written in the hypothesis implied sentence (for example, the clues (1) to (5)) and an implication determination means 82 (for example, an implication determination means 11) that determines whether a sentence to be determined (for example, a sentence to be determined T) that is a sentence to be determined whether it includes the hypothesis implies the given hypothesis.

The implication determination means 82, when it is determined that the given hypothesis is the new fact in the hypothesis implied sentence, compares a date and time of occurrence of the sentence to be determined (for example, the date and time in FIG. 3(c)) and a date and time of occurrence of the hypothesis implied sentence that implies the hypothesis (for example, the date and time in FIG. 3(b)), and determines whether the sentence to be determined implies the given hypothesis.

With such a configuration, the implication determination performance can be improved.

To be specific, the implication determination means 82 may determine, when a date and time of occurrence of a sentence to be determined is older than a date and time of occurrence of a hypothesis implied sentence that implies a given hypothesis, that the sentence to be determined does not imply the hypothesis. Further, the implication determination means 82 may, when the date and time of occurrence of the sentence to be determined is older than the date and time of occurrence of the hypothesis implied sentence that implies the given hypothesis, grant a penalty to the degree of implication that indicates the degree of implication of the sentence to be determined implying the hypothesis, compare a predetermined reference value and the degree of implication after grant of the penalty, and determine whether the sentence to be determined implies the given hypothesis.

Also, apart or the whole of the above-described exemplary embodiments may be described like, but is not limited to, the following supplementary notes.

(Supplementary note 1) An implication determining device comprising: a new fact determination means configured to determine whether a given hypothesis is a new fact indicating a first revealed fact in a hypothesis implied sentence implying the hypothesis based on a specific expression written in the hypothesis implied sentence; and an implication determination means configured to determine whether the given hypothesis is implied in a sentence to be determined that is a sentence to be determined whether the hypothesis is included, wherein, when it is determined that the given hypothesis is the new fact in the hypothesis implied sentence, the implication determination means compares a date and time of occurrence of the sentence to be determined and a date and time of occurrence of the hypothesis implied sentence implying the hypothesis, and determines whether the sentence to be determined implies the given hypothesis.

(Supplementary note 2) The implication determining device according to supplementary note 1, wherein, when the date and time of occurrence of the sentence to be determined is older than the date and time of occurrence of the hypothesis implied sentence implying the given hypothesis, the implication determination means determines that the sentence to be determined does not imply the hypothesis.

(Supplementary note 3) The implication determining device according to supplementary note 1, wherein, when the date and time of occurrence of the sentence to be determined is older than the date and time of occurrence of the hypothesis implied sentence implying the given hypothesis, the implication determination means decreases a value of the degree of implication indicating the degree of implication of the sentence to be determined implying the hypothesis or increases a value of a predetermined reference value, or decreases the value of the degree of implication and increases the value of the reference value, compares the reference value and the degree of implication, and determines whether the sentence to be determined implies the given hypothesis.

(Supplementary note 4) The implication determining device according to supplementary note 3, wherein, when the date and time of occurrence of the sentence to be determined is older than the date and time of occurrence of the hypothesis implied sentence implying the given hypothesis, the implication determination means decreases the degree of implication by a certain value or by a certain ratio, and determines that the sentence to be determined does not imply the given hypothesis when the degree of implication is less than the reference value.

(Supplementary note 5) The implication determining device according to supplementary note 3, wherein, when the date and time of occurrence of the sentence to be determined is older than the date and time of occurrence of the hypothesis implied sentence implying the given hypothesis, the implication determination means increases the predetermined reference value by a certain value or by a certain ratio, and determines that the sentence to be determined does not imply the given hypothesis when the degree of implication is less than the reference value.

(Supplementary note 6) The implication determining device according to any one of supplementary notes 1 to 5, comprising a new hypothesis determination means configured to identify a hypothesis that is not implied in any sentence to be determined.

(Supplementary note 7) The implication determining device according to anyone of supplementary notes 1 to 6, comprising, when it is determined that a given hypothesis is implied in a sentence to be determined, a hypothesis implied sentence adding means configured to add the sentence to be determined as a hypothesis implied sentence.

(Supplementary note 8) An implication determining method comprising: determining whether a given hypothesis is a new fact indicating a first revealed fact in a hypothesis implied sentence that is a sentence implying the hypothesis based on a specific expression written in the hypothesis implied sentence; and when it is determined that the given hypothesis is the new fact in the hypothesis implied sentence, comparing a date and time of occurrence of the sentence to be determined that is a sentence to be determined whether the given hypothesis is included and a date and time of occurrence of the hypothesis implied sentence implying the hypothesis, and determining whether the sentence to be determined implies the given hypothesis.

(Supplementary note 9) The implication determining method according to supplementary note 8, wherein, when the date and time of occurrence of the sentence to be determined is older than the date and time of occurrence of the hypothesis implied sentence implying the given hypothesis, it is determined that the sentence to be determined does not imply the hypothesis.

(Supplementary note 10) The implication determining method according to supplementary note 8, wherein, when the date and time of occurrence of the sentence to be determined is older than the date and time of occurrence of the hypothesis implied sentence implying the given hypothesis, a value of the degree of implication indicating the degree of implication of the sentence to be determined implying the hypothesis is decreased or a value of a predetermined reference value is increased, or the value of the degree of implication is decreased and the value of the reference value is increased, the reference value and the degree of implication are compared, and whether the sentence to be determined implies the given hypothesis is determined.

(Supplementary note 11) An implication determining program causing a computer to execute: a new fact determination process to determine whether a given hypothesis is a new fact indicating a first revealed fact in a hypothesis implied sentence that is a sentence implying the hypothesis based on a specific expression written in the hypothesis implied sentence; and an implication determination process to determine whether the given hypothesis is implied in a sentence to be determined that is a sentence to be determined whether the given hypothesis is included, wherein, when it is determined that the given hypothesis is the new fact in the hypothesis implied sentence, in the implication determination process, a date and time of occurrence of the sentence to be determined and a date and time of occurrence of the hypothesis implied sentence implying the hypothesis are compared, and whether the sentence to be determined implies the given hypothesis is determined.

(Supplementary note 12) The implication determining program according to supplementary note 11, wherein, when the date and time of occurrence of the sentence to be determined is older than the date and time of occurrence of the hypothesis implied sentence implying the given hypothesis, the computer is caused to determine, in the implication determination process, that the sentence to be determined does not imply the hypothesis.

(Supplementary note 13) The implication determining program according to supplementary note 11, wherein, when the date and time of occurrence of the sentence to be determined is older than the date and time of occurrence of the hypothesis implied sentence implying the given hypothesis, the computer is caused, in the implication determination process, to decrease a value of the degree of implication indicating the degree of implication of the sentence to be determined implying the hypothesis or to increase a value of a predetermined reference value, or to decrease the value of the degree of implication and to increase the value of the reference value, to compare the reference value and the degree of implication, and to determine whether the sentence to be determined implies the given hypothesis.

As described above, the present invention has been described with reference to the exemplary embodiments and examples. However, the present invention is not limited to the above-described exemplary embodiment and examples. It should be understood by those skilled in the art that various modifications may be made to the configuration and details of the present invention within the scope of the present invention.

The present patent application claims a priority based on Japanese Patent Application No. 2010-236548 filed on Oct. 21, 2010 and the entire content of which is hereby incorporated.

INDUSTRIAL APPLICABILITY

The implication determining device of the present invention can be used for refinement of a search result in a document retrieval system and for selection of a candidate sentence of a summary in a document summary system.

REFERENCE SIGNS LIST

1 Data processing device
10 New fact determination means
11 Implication determination means
12 New hypothesis determination means
13 Hypothesis implied sentence adding means
2 Storage device
20 Document to be determined storage unit
21 Hypothesis storage unit
22 Hypothesis implied document storage unit
23 New fact determination result storage unit
24 Degree of implication storage unit
25 Implication determination result storage unit
26 New hypothesis storage unit

What is claimed is:
1. An implication determining device having a processor for implementing units comprising:
  a new fact determination unit configured to determine whether a given hypothesis is a new fact indicating a first revealed fact in a hypothesis implied sentence implying the hypothesis based on a specific expression written in the hypothesis implied sentence; and
  an implication determination unit configured to determine whether the given hypothesis is implied in a sentence to be determined that is a sentence to be determined whether the hypothesis is included,
  wherein the new fact determination unit determines whether a given hypothesis is a new fact with a clue of the specific expressions included in a document, and wherein, when it is determined that the given hypothesis is the new fact in the hypothesis implied sentence, the implication determination unit compares a date and time of occurrence of the sentence to be determined and a date and time of occurrence of the hypothesis implied sentence implying a hypothesis which is determined as the new fact, and determines whether the sentence to be determined implies the given hypothesis.

2. The implication determining device according to claim 1, wherein, when the date and time of occurrence of the sentence to be determined is older than the date and time of occurrence of the hypothesis implied sentence implying the given hypothesis, the implication determination unit determines that the sentence to be determined does not imply the hypothesis.

3. The implication determining device according to claim 1, wherein, when the date and time of occurrence of the sentence to be determined is older than the date and time of occurrence of the hypothesis implied sentence implying the given hypothesis, the implication determination unit decreases a value of the degree of implication indicating the degree of implication of the sentence to be determined implying the hypothesis or increases a value of a predetermined reference value, or decreases the value of the degree of implication and increases the value of the reference value, compares the reference value and the degree of implication, and determines whether the sentence to be determined implies the given hypothesis.

4. The implication determining device according to claim 3, wherein, when the date and time of occurrence of the sentence to be determined is older than the date and time of occurrence of the hypothesis implied sentence implying the given hypothesis, the implication determination unit decreases the degree of implication by a certain value or by a certain ratio, and determines that the sentence to be determined does not imply the given hypothesis when the degree of implication is less than the reference value.

5. The implication determining device according to claim 3, wherein, when the date and time of occurrence of the sentence to be determined is older than the date and time of occurrence of the hypothesis implied sentence implying the given hypothesis, the implication determination unit increases the predetermined reference value by a certain value or by a certain ratio, and determines that the sentence to be determined does not imply the given hypothesis when the degree of implication is less than the reference value.

6. The implication determining device according to claim 1, comprising a new hypothesis determination unit configured to identify a hypothesis that is not implied in any sentence to be determined.

7. The implication determining device according to claim 1, comprising, when it is determined that a given hypothesis is implied in a sentence to be determined, a hypothesis implied sentence adding unit configured to add the sentence to be determined as a hypothesis implied sentence.

8. An implication determining method comprising:
   determining whether a given hypothesis is a new fact indicating a first revealed fact in a hypothesis implied sentence that is a sentence implying the hypothesis based on a specific expression written in the hypothesis implied sentence, including determining whether a given hypothesis is a new fact with a clue of the specific expressions included in a document; and
   when it is determined that the given hypothesis is the new fact in the hypothesis implied sentence, comparing a date and time of occurrence of a sentence to be determined that is a sentence to be determined whether the given hypothesis is included and a date and time of occurrence of the hypothesis implied sentence implying the hypothesis which is determined as the new fact, and determining whether the sentence to be determined implies the given hypothesis.

9. A non-transitory computer readable information recording medium storing an implication determining program that, when executed by a processor, performs a method for:
   determining whether a given hypothesis is a new fact indicating a first revealed fact in a hypothesis implied sentence that is a sentence implying the hypothesis based on a specific expression written in the hypothesis implied sentence, including determining whether a given hypothesis is a new fact with a clue of the specific expressions included in a document; and
   when it is determined that the given hypothesis is the new fact in the hypothesis implied sentence, comparing a date and time of occurrence of a sentence to be determined that is a sentence to be determined whether the given hypothesis is included and a date and time of occurrence of the hypothesis implied sentence implying the hypothesis which is determined as the new fact, and determining whether the sentence to be determined implies the given hypothesis.

* * * * *